US009715601B2

(12) United States Patent
Pedersen

(10) Patent No.: US 9,715,601 B2
(45) Date of Patent: Jul. 25, 2017

(54) SECURE ACCESS IN A MICROCONTROLLER SYSTEM

(71) Applicant: Atmel Corporation, San Jose, CA (US)

(72) Inventor: Frode Milch Pedersen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 100 days.

(21) Appl. No.: 14/698,330

(22) Filed: Apr. 28, 2015

(65) Prior Publication Data

US 2016/0321472 A1  Nov. 3, 2016

(51) Int. Cl.
*G06F 21/31* (2013.01)
*G06F 21/85* (2013.01)
*G06F 21/57* (2013.01)
*G06F 21/74* (2013.01)

(52) U.S. Cl.
CPC ............ *G06F 21/85* (2013.01); *G06F 21/575* (2013.01); *G06F 21/74* (2013.01)

(58) Field of Classification Search
CPC ........ G06F 21/31; G06F 21/85; G06F 21/575; G06F 21/74
USPC .......................................................... 726/16
See application file for complete search history.

(56) References Cited

U.S. PATENT DOCUMENTS

| 8,051,467 | B2 | 11/2011 | Renno | |
|---|---|---|---|---|
| 2004/0034823 | A1* | 2/2004 | Watkins | ................... G06F 21/71 714/724 |
| 2006/0059285 | A1* | 3/2006 | Fischer | ................... G06F 21/74 710/124 |
| 2011/0161645 | A1* | 6/2011 | Zhang | ................... G06F 21/575 713/2 |

OTHER PUBLICATIONS

International Search Report and Written Opinion in International Application No. PCT/US2016/029033, mailed Aug. 8, 2016, 11 pages.

* cited by examiner

*Primary Examiner* — Kambiz Zand
*Assistant Examiner* — Aubrey Wyszynski
(74) *Attorney, Agent, or Firm* — Fish & Richardson P.C.

(57) ABSTRACT

Systems, methods and computer-readable mediums are disclosed for providing secure access in a microcontroller system. In some implementations, a microcontroller system comprises a system bus and a secure central processing unit (CPU) coupled to the system bus. The secure CPU is configured to provide secure access to the system bus. A non-secure CPU is also coupled to the system bus and is configured to provide non-secure access to the system bus. A non-secure memory is coupled to the system bus and is configured to allow the secure CPU and the non-secure CPU to exchange data and communicate with each other. A peripheral access controller (PAC) is coupled to the system bus and configured to enable secure access to a peripheral by the secure CPU while disabling non-secure access to the peripheral based upon a non-secure state of the non-secure CPU.

20 Claims, 2 Drawing Sheets

SECURE ACCESS IN A MICROCONTROLLER SYSTEM

TECHNICAL FIELD

This disclosure relates to secure information processing.

BACKGROUND

When designing products with microcontroller systems it may be desirable to program code into secure memory so that a customer can execute the code but not copy or modify the code. Additionally, it may be desirable to partition an application into secure and non-secure domains, where the secure domain allows critical information (e.g., cryptographic keys) to be processed by code stored in secure memory with full system access, while the non-secure domain does not have access to the secure memory. This split domain architecture improves security robustness by preventing software errors from accidentally leaking information from the secure domain into the non-secure domain. Microcontroller systems with split domain architectures are designed with a single central processing unit (CPU) that is designed to operate in secure and non-secure modes to ensure a safe transition between secure and non-secure operations.

SUMMARY

Systems, methods and computer-readable mediums are disclosed for providing secure access in a microcontroller system. In some implementations, a microcontroller system comprises a system bus and a secure central processing unit (CPU) coupled to the system bus. The secure CPU is configured to provide secure access to the system bus. A non-secure CPU is also coupled to the system bus and is configured to provide non-secure access to the system bus. A non-secure memory is coupled to the system bus and is configured to allow the secure CPU and the non-secure CPU to exchange data and communicate with each other. A peripheral access controller (PAC) is coupled to the system bus and configured to enable secure access to a peripheral by the secure CPU while disabling non-secure access to the peripheral based upon a non-secure state of the non-secure CPU.

In some implementations, a method comprises: detecting, by a microcontroller system, a system event; and responsive to the system event: configuring a first CPU of the microcontroller system to operate in secure mode, where secure mode allows secure access to a system bus of the microcontroller system and execution of secure code on the first CPU; configuring a second CPU to operate in non-secure mode, where non-secure mode allows non-secure access to the system bus and to execute non-secure code on the second CPU; configuring the first CPU and the second CPU to exchange data and communicate with each other using non-secure shared memory; and configuring a peripheral access controller (PAC) coupled to the system bus to allow secure communication between the PAC and a peripheral coupled to the PAC.

In some implementations, a non-transitory, computer-readable storage medium has instructions stored thereon, which, when executed by two or more central processing units of a microcontroller system, causes the two or more central processing units of the microcontroller system to perform operations comprising: detecting a system event; and responsive to the system event: configuring a first CPU to operate in secure mode, where secure mode allows secure access to a system bus of the microcontroller system and to execute secure code on the first CPU; configuring a second CPU to operate in non-secure mode, where non-secure mode allows non-secure access to the system bus and to execute non-secure code on the second CPU; configuring the first CPU and the second CPU to exchange data and communicate with each other using non-secure shared memory; and configuring a peripheral access controller (PAC) coupled to the system bus, the PAC allowing secure communication between the PAC and a peripheral coupled to the PAC.

DETAILED DESCRIPTION

Example System Architecture

Figure 1:
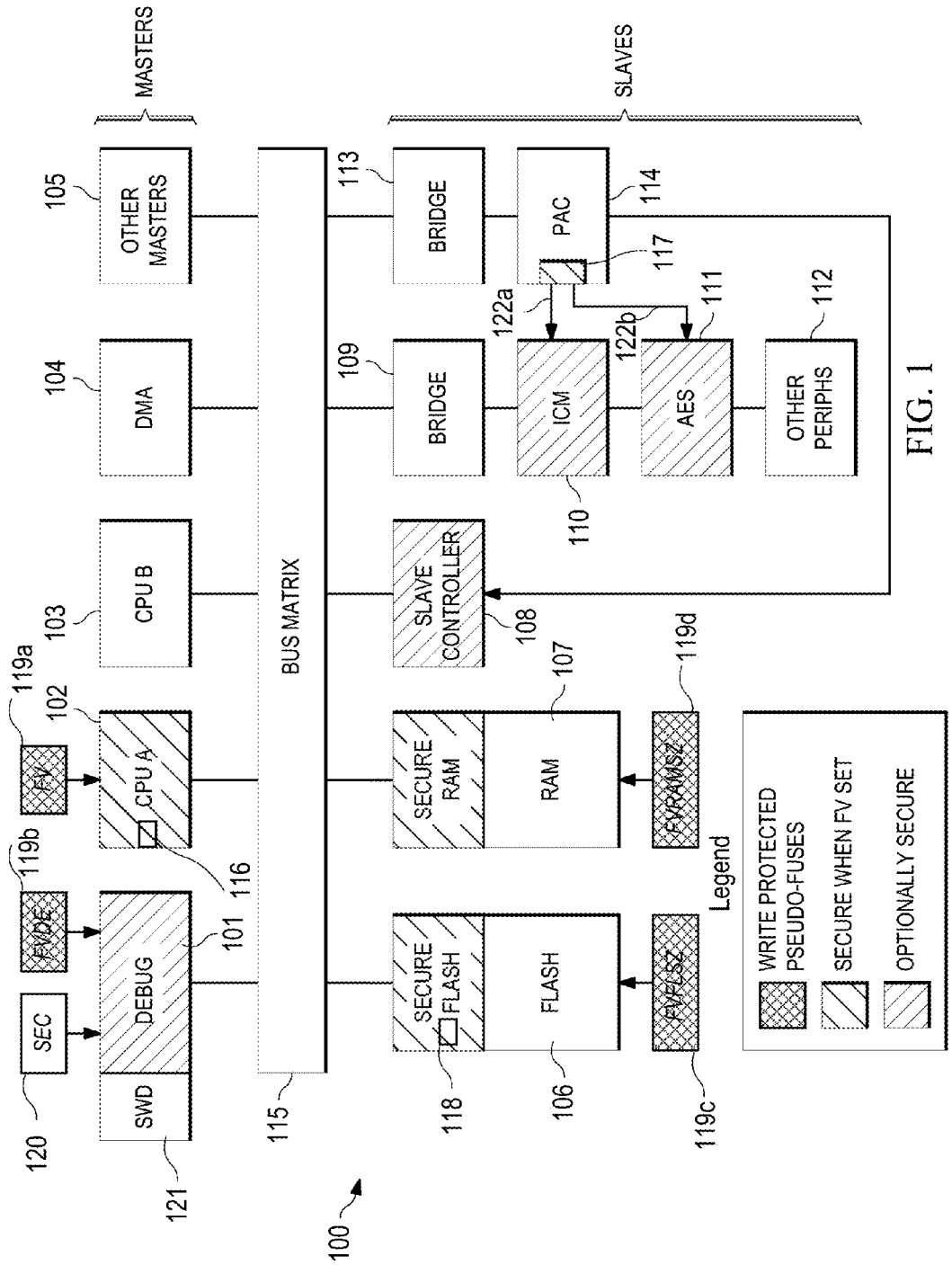
FIG. 1 is a conceptual block diagram of a microcontroller system with secure information processing extensions, according to some implementations.

FIG. 1 is a conceptual block diagram of a microcontroller system 100 with secure information processing extensions, according to some implementations. Microcontroller system 100 can include debug master module 101, central processing unit (CPU) 102, CPU 103, direct memory access (DMA) controller 104, memory 106 (e.g., Flash), 107 (e.g., RAM), slave controller 108, bridges 109, 113, slave modules 110, 111 and peripheral access controller (PAC) 114. The masters and slave modules 110, 111, 112 and PAC 114 are coupled directly or indirectly (e.g., through bridges 109, 113) to system bus 115 (e.g., a bus matrix). The system bus is configurable to route secure access requests from secure CPU 102. In some implementations, the secure access request can be associated with a signal indicating the request was initiated by secure CPU 102. In some implementations, slave module 110 is a cryptographic slave module for implementing an Integrity Check Monitor (ICM) capable of executing cryptographic hash algorithms, and slave module 111 is a cryptographic slave module for implementing an Advanced Encryption Standard (AES) algorithm. In some implementations, slave modules 110, 111 receive secure signals 122a, 122b from PAC 114. When secure signals 122a, 122b are high (or low), only secure bus accesses are permitted. In some implementations, slave modules 110, 111 can include software wrapper layers for receiving secure signals 122a, 122b. Microcontroller system 100 can include other master modules 105 and other slave modules 112 in addition to, or in place of, the master and slave modules shown in FIG. 1. Other slave modules 112, if configured as secure slave modules, can be configured to receive secure signals from PAC 114 to allow only secure bus accesses.

To assist the reader, FIG. 1 includes a Legend that associates block fill patterns with secure (forward slash fill pattern) and optionally secure (backward slash fill pattern) master and slave modules in microcontroller system 100. The Legend also shows that blocks with a cross hatch fill pattern indicate fuses 119a-119d (e.g., write protected pseudo fuses). In some implementations, fuses 119a-119d can be real fuses latched in memory (e.g., memory 106) at system reset or pseudo fuses read from memory (e.g., non-volatile memory) and latched in a memory controller (not shown) at system reset. Microcontroller system 100 can be extended to include additional CPUs, where each additional CPU can be configured to be secure or non-secure and each secure CPU can share the same secure memory resources.

In response to a system event (e.g., a system reset), CPU 102 can be configured as a secure CPU and CPU 103 can be configured as a non-secure CPU. Secure CPU 102 runs secure code and provides secure access to system bus 115, while non-secure CPU 103 runs non-secure code and provides non-secure access to system bus 115. The security configuration can be static (e.g., hardwired in the design) or programmable by pseudo fuses 119a (FV; FlashVault Enable), 119b (FVDE; FlashVault Debug Enable), 119c (FVFLSZ; FlashVault Flash Size) and 119d (FVRAMSZ; FlashVault RAM Size) (e.g., write protected pseudo fuses). The pseudo fuses can be loaded at system reset to configure microcontroller system 100 before any client application code executes.

The security configuration described above allows secure code to execute on secure CPU 102, while data exchange and communication between secure CPU 102 and non-secure CPU 103 takes place in non-secure portions of memories 106, 107. In some implementations, secure CPU 102 can configure itself (e.g., by means of internal control register 116) to temporarily provide non-secure access to system bus 115. This can improve robustness if non-secure and secure code need to execute on the same CPU. Secure bus accesses can be disabled before executing the non-secure code, then re-enabled when executing further secure code. This prevents software errors in the non-secure code from accidently reading data from secure memory.

Slave modules 110, 111, 112 (e.g., peripherals) in microcontroller system 100 can be accessed by secure CPU 102 or non-secure CPU 103. When secure software depends on secure interaction with a peripheral (e.g., cryptographic modules 110, 111), access to the peripheral should be limited to secure access. In some implementations, secure access can be centralized in microcontroller system 100 by PAC 114, which can be configured to distribute one or more signals to each slave module or peripheral of system 100 to command each slave module or peripheral to only accept secure accesses provided by secure CPU 102. The one or more signals can be switched on by one or more bits being written to control register 117 in PAC 114. Control register 117 can be written by a secure access provided by secure CPU 102. Control register 117 enables secure CPU 102 to enable secure access to critical peripherals for as long as needed and disable secure access when the secure operation is complete, thus allowing the peripheral to be controlled by non-secure CPU 103.

In some implementations, secure CPU 102 can be secure by setting fuse FV. Secure CPU 102 can optionally switch off secure bus access by setting one or more bits in control register 116, which can be external or internal to secure CPU 102 (shown as internal to secure CPU 102 in FIG. 1). Secure CPU 102 can be controlled and debugged by bus mapped control registers (not shown). When FV is set, the bus mapped control registers can be modified by secure access provided by secure CPU 102. In some implementations, secure CPU 102 can boot from boot code 118 stored in a secure portion of non-volatile (NV) memory 106 (e.g., Flash memory). The upper portions of NVM 106 and volatile memory 107 (e.g., RAM) can be reserved for secure operations. These secure portions of memory can be set up by size fuses FVFLSZ (NVM 106) and FVRAMSZ (RAM 107). The NVM and RAM controllers (e.g., DMA 104) will provide secure access to the secure memory regions and secure or non-secure access to non-secure memory regions.

In some implementations, PAC 114 includes control register 117 where a user can write a peripheral identifier indicating which peripheral to target for access and a KEY value to enable or disable secure access to the peripheral. The KEY value can be written/programmed by secure CPU 102 as a secure write operation. Control register 117 can also be used to write protect the peripheral using different KEY values, which can be written to control register 117 by non-secure access.

In some implementations, debug master module 101 is controlled by an external debugger (external to microcontroller system 100) and grants access to internal resources for programming and debugging. By default, debug master module 101 can be non-secure and can provide non-secure access to non-secure memory and peripherals. To aid development of secure code, debug master module 101 can be made temporarily secure by setting the FVDE fuse. When FVDE is set, debug master module 101 is secure and can access all memories and peripherals in microcontroller system 100, including control registers in secure CPU 102 and PAC 114. In some implementations, a user can erase the FVDE fuse before deploying the application to the end customer to ensure that the external debugger cannot read out secure memories in a customer application. In the example shown, SEC 120 is a security fuse which, when programmed, disables all external debug access. SEC 120 can only be restored by a full chip erase command, which erases all memory contents. SWD 121 is a Serial Wire Debug interface for communicating with the external debugger over a serial bus.

Example Process

Figure 2:
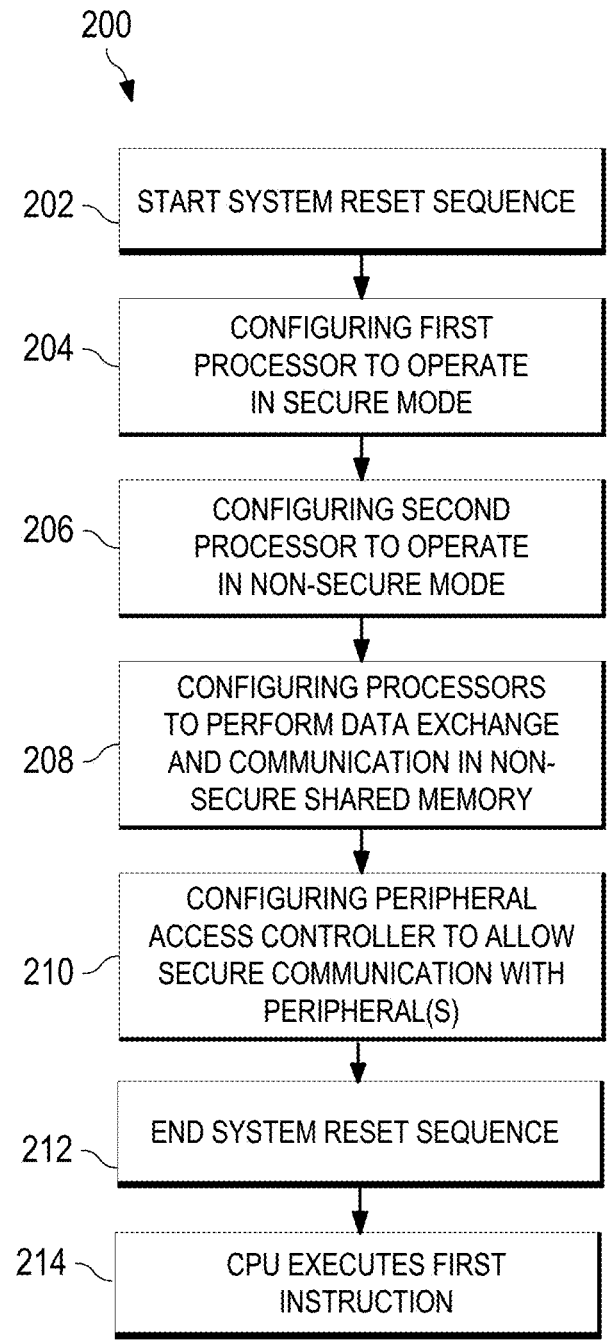
FIG. 2 is a flow diagram of an example process performed by a microcontroller system with secure information processing extensions, according to some implementations.

FIG. 2 is a flow diagram of an example process 200 of performed by a microcontroller system with secure information processing extensions, according to one implementation. Process 200 can be implemented in, for example, microcontroller system 100 described in reference to FIG. 1.

In some implementations, process 200 can begin by detecting, by the microcontroller system, start of a system reset sequence (202). Responsive to the system event, process 200 can continue by configuring a first CPU of the microcontroller system to operate in secure mode that allows secure access to a system bus of the microcontroller system and to run secure code on the first CPU (204). For example, the system event can be a system reset and a fuse bit can be set at system reset that configures the first CPU to operate in secure mode.

Process 200 can continue by configuring a second CPU to operate in non-secure mode that allows non-secure access to the system bus and to run non-secure code on the second CPU (206).

Process 200 can continue by configuring the first CPU and the second CPU to exchange data and communicate with each other using non-secure shared memory (208). For example memory coupled to the system bus can be divided into secure and non-secure portions and the secure CPU and non-secure CPU can exchange data and communicate using the portion of non-secure shared memory.

Process 200 can continue by configuring a peripheral access controller (PAC) coupled to the system bus to allow secure communication between the PAC and one or more peripherals coupled to the PAC (210). For example, the PAC can be coupled directly or indirectly (e.g., through bridge 113 in FIG. 1) to the system bus and distributes one or more signals to each peripheral to command the peripheral to only allow secure accesses.

When process 200 ends the system reset sequence (212), the CPU can execute its first instruction (214).

While this document contains many specific implementation details, these should not be construed as limitations on the scope of what may be claimed but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A microcontroller system comprising:
   a system bus;
   a secure central processing unit (CPU) coupled to the system bus, the secure CPU configured to provide secure access to the system bus;
   a non-secure CPU coupled to the system bus, the non-secure CPU configured to provide non-secure access to the system bus;
   non-secure memory coupled to the system bus, the non-secure memory configured to allow the secure CPU and the non-secure CPU to exchange data and communicate with each other; and
   a peripheral access controller (PAC) coupled to the system bus, the PAC configured to enable secure access to a peripheral by the secure CPU while disabling non-secure access to the peripheral based upon a non-secure state of the non-secure CPU.

2. The microcontroller system of claim 1, further comprising:
   a secure control register included in the PAC, the secure control register programmable by the secure CPU to enable secure access for a secure operation and to disable secure access when the secure operation is complete.

3. The microcontroller system of claim 2, where the secure control register is configured during a secure write operation by the secure CPU to receive a peripheral identifier for targeting the peripheral for access and a key value, the key value enabling secure access to the peripheral by the secure CPU.

4. The microcontroller system of claim 1, where the secure CPU is configured to be secure and the non-secure CPU is configured to be non-secure at system reset.

5. The microcontroller system of claim 4, where configuration of the secure CPU and the non-secure CPU is programmable by pseudo fuses.

6. The microcontroller system of claim 5, where the pseudo fuses are loaded in non-volatile memory at system reset.

7. The microcontroller system of claim 1, further comprising a configuration register included in the secure CPU, the configuration register programmable to temporarily provide non-secure bus access to the secure CPU.

8. The microcontroller system of claim 1, further comprising:
   a debug master module coupled to the system bus, the debug master module programmable to be temporarily secure to allow access by the debug master module to secure and non-secure memory, registers or peripherals of the microcontroller system.

9. The microcontroller system of claim 1, where a portion of memory of the microcontroller system is configured to be secure at system reset.

10. The microcontroller system of claim 1, where the system bus is a bus matrix configurable to route secure access requests from the secure CPU using one or more bits of an opcode or memory address.

11. A method comprising:
    detecting, by a microcontroller system, a system event; and
    responsive to the system event:
    configuring a first CPU of the microcontroller system to operate in secure mode, where secure mode allows secure access to a system bus of the microcontroller system and execution of secure code on the first CPU;
    configuring a second CPU to operate in non-secure mode, where non-secure mode allows non-secure access to the system bus and to execute non-secure code on the second CPU;
    configuring the first CPU and the second CPU to exchange data and communicate with each other using non-secure shared memory; and
    configuring a peripheral access controller (PAC) coupled to the system bus to allow secure communication between the PAC and a peripheral coupled to the PAC.

12. The method of claim 11, further comprising:
    configuring a debug master module of the microcontroller system to execute secure code and access secure memory, registers or peripherals of the microcontroller system.

13. The method of claim 11, where configuring the first CPU to operate in secure mode further comprises setting a pseudo fuse.

14. The method of claim 11, further comprising:
    configuring the first CPU to set one or more control bits in a control register that is internal or external to the first CPU to enable secure access to the system bus by the first CPU.

15. The method of claim 11, further comprising
    booting the first CPU during a reset of the microcontroller system using boot code stored in secure non-volatile memory.

16. A non-transitory, computer-readable storage medium having instructions stored thereon, which, when executed by two or more central processing units of a microcontroller system, causes the two or more central processing units of the microcontroller system to perform operations comprising:
    detecting a system event; and
    responsive to the system event:
    configuring a first CPU to operate in secure mode, where secure mode allows secure access to a system bus of the microcontroller system and to execute secure code on the first CPU;
    configuring a second CPU to operate in non-secure mode, where non-secure mode allows non-secure access to the system bus and to execute non-secure code on the second CPU;
    configuring the first CPU and the second CPU to exchange data and communicate with each other using non-secure shared memory; and configuring a peripheral access controller (PAC) coupled to the system bus, the PAC allowing secure communication between the PAC and a peripheral coupled to the PAC.

17. The non-transitory, computer-readable storage medium of claim 16, where the operations further comprise:
configuring a debug master module in the microcontroller system to execute secure code and access secure memory, registers or peripherals of the microcontroller system.

18. The non-transitory, computer-readable storage medium of claim 16, where configuring the first CPU to operate in secure mode further comprises setting a pseudo fuse.

19. The non-transitory, computer-readable storage medium of claim 16, where the operations further comprise:
configuring the first CPU to set one or more control bits in a control register that is internal or external to the first CPU to enable secure access to the system bus by the first CPU.

20. The non-transitory, computer-readable storage medium of claim 16, where the operations further comprise:
booting the first CPU during a reset of the microcontroller system using boot code stored in secure non-volatile memory.

* * * * *